United States Patent [19]

Birk

[11] Patent Number: 5,577,745

[45] Date of Patent: Nov. 26, 1996

[54] PERSONAL MATERIAL HANDLING SYSTEM

[76] Inventor: James R. Birk, 7100 SW. 139th, Oklahoma City, Okla. 73173

[21] Appl. No.: 583,265

[22] Filed: Jan. 5, 1996

Related U.S. Application Data

[63] Continuation of Ser. No. 142,254, Oct. 22, 1993, abandoned.

[51] Int. Cl.⁶ ............................................. B62B 1/00
[52] U.S. Cl. ............................ 280/47.19; 280/47.28; 280/47.29; 242/129.5
[58] Field of Search ........................ 280/47.28, 47.29, 280/47.19, 47.18, 47.27, 47.131, 47.17; 242/129.5, 129.7, 129.71

[56] References Cited

U.S. PATENT DOCUMENTS

| D. 148,684 | 2/1948 | Fletcher | D14/3 |
|---|---|---|---|
| 3,765,619 | 10/1973 | Stillman | 242/129.5 |
| 3,831,877 | 8/1974 | Bennett et al. | 242/86.5 R |
| 3,897,080 | 7/1975 | Isom | 280/47.19 |
| 3,937,414 | 2/1976 | Bank et al. | 242/86.5 R |
| 3,990,653 | 11/1976 | Marcell | 242/129.8 |
| 4,185,853 | 1/1980 | Thurmond, Jr. | 280/652 |
| 4,457,527 | 7/1984 | Lowery | 280/47.19 |
| 4,564,152 | 1/1986 | Herriage | 242/86.5 |
| 4,585,130 | 4/1986 | Brennan | 211/190 |
| 4,611,645 | 9/1986 | Whisnant | 242/129.5 |
| 4,921,270 | 5/1990 | Schoberg | 280/47.28 X |
| 5,127,664 | 7/1992 | Cheng | 280/655 |

FOREIGN PATENT DOCUMENTS

| 1247232 | 10/1960 | France | 280/47.18 |
|---|---|---|---|
| 2584358 | 1/1987 | France | 280/47.29 |

*Primary Examiner*—Robert J. Oberleitner
*Assistant Examiner*—Peter M. Poon
*Attorney, Agent, or Firm*—Dunlap & Codding

[57] ABSTRACT

A hand dolly or personal material handling system is provided having a removable reel holder which can be loaded with reels of wire in an extended position, or retracted. The handling system is adapted to carry attachments, including a long stock holder for carrying pipe or electrical conduit, a cable spindle for carrying a reel of coaxial cable, a utility basket, and reel supports for carrying different sized reels of wire or cable. Different configurations of attachments are used depending on the carrying requirements of the handling system.

10 Claims, 11 Drawing Sheets

PERSONAL MATERIAL HANDLING SYSTEM

CROSS REFERENCE TO RELATED APPLICATION

This is a continuation of U.S. Ser. No. 08/142,254, filed Oct. 22, 1993, entitled "WORK TRUCK", now abandoned.

FIELD OF THE INVENTION

The present invention relates generally to hand carts or dollies and, more particularly, to a dolly with a removable and retractable reel holder for carrying wire reels and various attachments to adapt the dolly for carrying specialized articles such as, for example, electrical conduit and pipe.

BRIEF DESCRIPTION OF THE DRAWINGS

FIG. 13 is a front perspective view of the long stock holder and personal material handling system of FIG. 12 with the personal material handling system in an operating position.

DESCRIPTION OF THE PREFERRED EMBODIMENTS

Figures 1, 2:
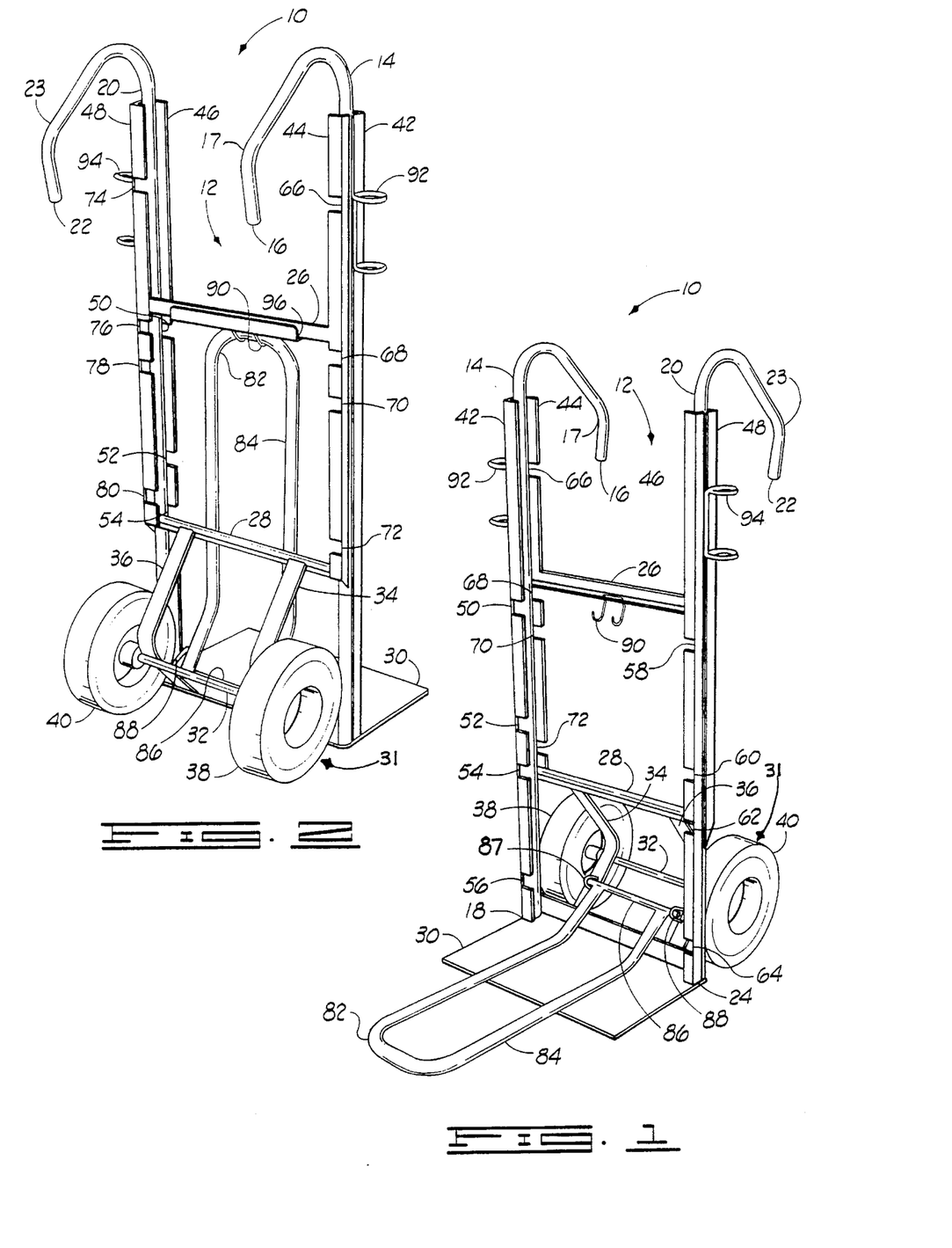
FIG. 1 is a front perspective view of a personal material handling system constructed in accordance with the present invention, with a nose extension in an extended position.
FIG. 2 is a rear perspective view of the personal material handling system of FIG. 1 with the nose extension in a retracted position.

Shown in FIGS. 1 and 2 is a personal material handling system (also called herein the "handling system") constructed in accordance with the present invention and designated by the general reference numeral 10.

The handling system 10 includes a frame 12 having a first vertical member 14 with a first end 16 and a second end 18, and a second vertical member 20, with a first end 22 and a second end 24. The first vertical member 14, near the first end 16, is formed into a first hand grip 17, and the second vertical member 20 near the first end 22 is formed into a second hand grip 23. First and second cross-members 26 and 28 are connected to the first and second vertical members 14 and 20. The first vertical member 14 at the second end 18, and the second vertical member 20 at the second end 24, are connected to a support plate 30.

The frame 12 of the handling system 10 is connected to a wheel support assembly 31 comprising an axle 32 connected to first and second curved supports 34 and 36, which are in turn attached to the second cross-member 28 and the support plate 30. Wheels 38 and 40 are rotatably connected to the axle 32.

The frame 12 additionally includes first and second securing flanges 42 and 44 connected to the first vertical member 14, and third and fourth securing flanges 46 and 48 connected to the second vertical member 20. The first securing flange 42 includes receiving slots 50, 52, 54, and 56, and the second securing flange 44 includes receiving slots 66, 68, 70 and 72. The third securing flange 46 includes receiving slots 58, 60, 62 and 64, and the fourth securing flange 48 includes receiving slots 74, 76, 78 and 80.

Figure 5:
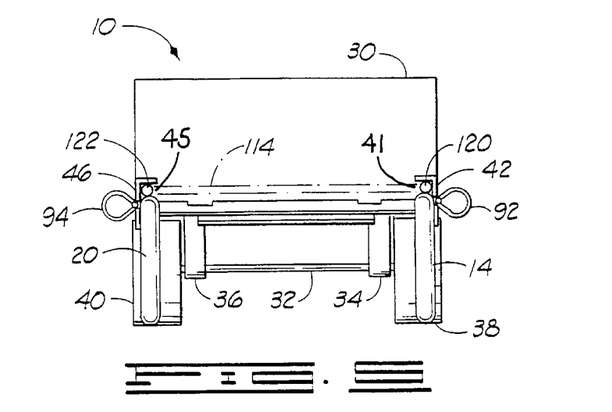
FIG. 5 is a top elevational view of the personal material handling system of FIG. 4 showing the disposition of a second attachment bar of the carrying basket.
Figure 7:
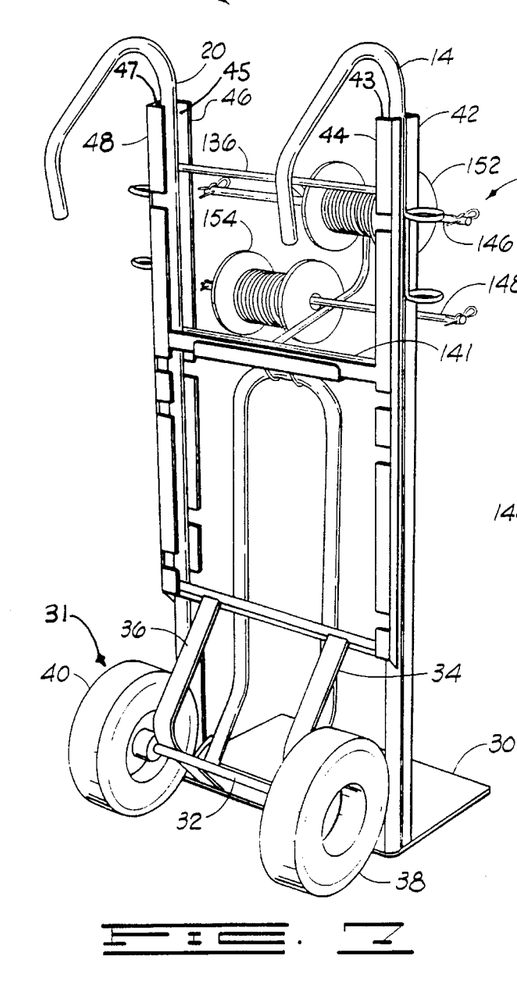
FIG. 7 is a rear perspective view of the personal material handling system of the present invention with the multiple spool holder attached thereto.

A channel 41 is formed between the first securing flange 42 and the first vertical member 14 (FIG. 5). Channel 43 is formed between the second securing flange 44 and the first vertical member 14 (FIG. 7). Channel 45 is formed between the third securing flange 46 and the second vertical member 20 (FIG. 5). Channel 47 is formed between the fourth securing flange 48 and the second vertical member 20 (FIG. 7). These channels are adapted to slidingly receive attachment bars and attachment prongs attached to accessories adapted to be slidingly mounted in the channels, as will be explained below.

The handling system 10 additionally comprises a nose extension 82, comprising a U-shaped member 84 attached to a pivot rod 86, which is rotatably secured between a U-shaped attachment 87 connected to the first curved support 34 and a U-shaped attachment 88 connected to the second curved support 36. As shown in FIG. 1, the nose extension 82 is in an extended position. The nose extension 82 is adapted to hold bulky items, such as florescent light fixtures (not shown) or boxes (not shown) which would ordinarily be too large to securely fit on the support plate 30. Cargo may be attached to the nose extension 82 by means of rope (not shown) or bungie cords (not shown).

FIG. 2 shows the nose extension 82 in a retracted position, secured by a securing hook 90. In the secured position, the nose extension 82 rests generally within the frame 12, and the handling system 10 can be used in the same manner as an ordinary hand truck.

The frame 12 of the handling system 10 additionally comprises a first cable bender holster 92, attached to the first vertical member 14, and a second cable bender holster 94, attached to the second vertical member 20. The first and second cable bender holsters 92 and 94 are adapted to hold conduit benders (not shown).

As shown in FIG. 2, the frame 12 of the handling system 10 additionally includes a ladder support flange 96 which is attached to the first cross-member 26. The ladder support flange 96 is adapted to receive the lip of a step or rung of a ladder sized to fit between the first and second vertical members 14 and 20, as will be explained below.

Figure 3:
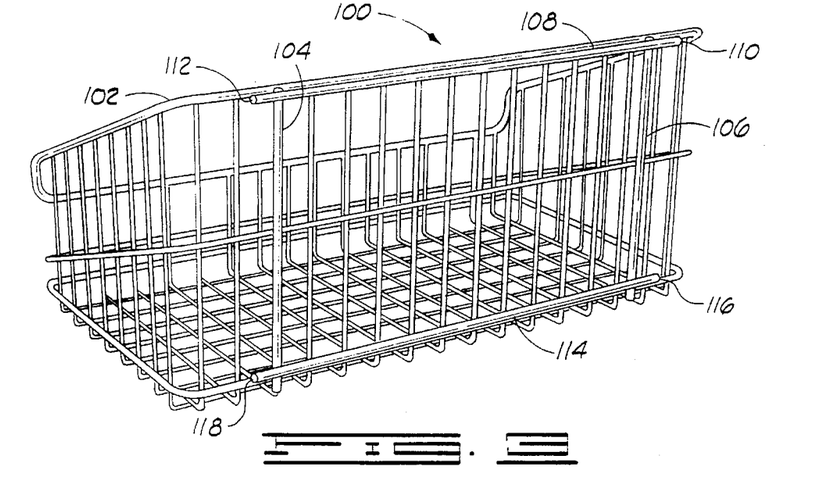
FIG. 3 is a rear perspective view of a carrying basket.

As discussed previously, the handling system 10 can include removable attachments, such as a carrying basket 100 shown in FIG. 3. The carrying basket 100 has a cage frame 102, a first vertical support 104 attached to the cage frame 102, a second vertical support 106 attached to the cage frame 102 generally parallel to the first vertical support 104 and separated a distance from the first vertical support 104. The carrying basket 100 is connected to the handling system 10 by way of a first attachment bar 108 attached to the first and second vertical supports 104, 106 of the frame 12.

The first attachment bar 108 has a first end 110 and a second end 112. A second attachment bar 114 is additionally attached to the first vertical support 104 and the second vertical support 106. The second attachment bar 114 is separated a distance from the first attachment bar 108, and is generally parallel to the first attachment bar 108. The second attachment bar 114 has a first end 116 and a second end 118.

Figure 4:
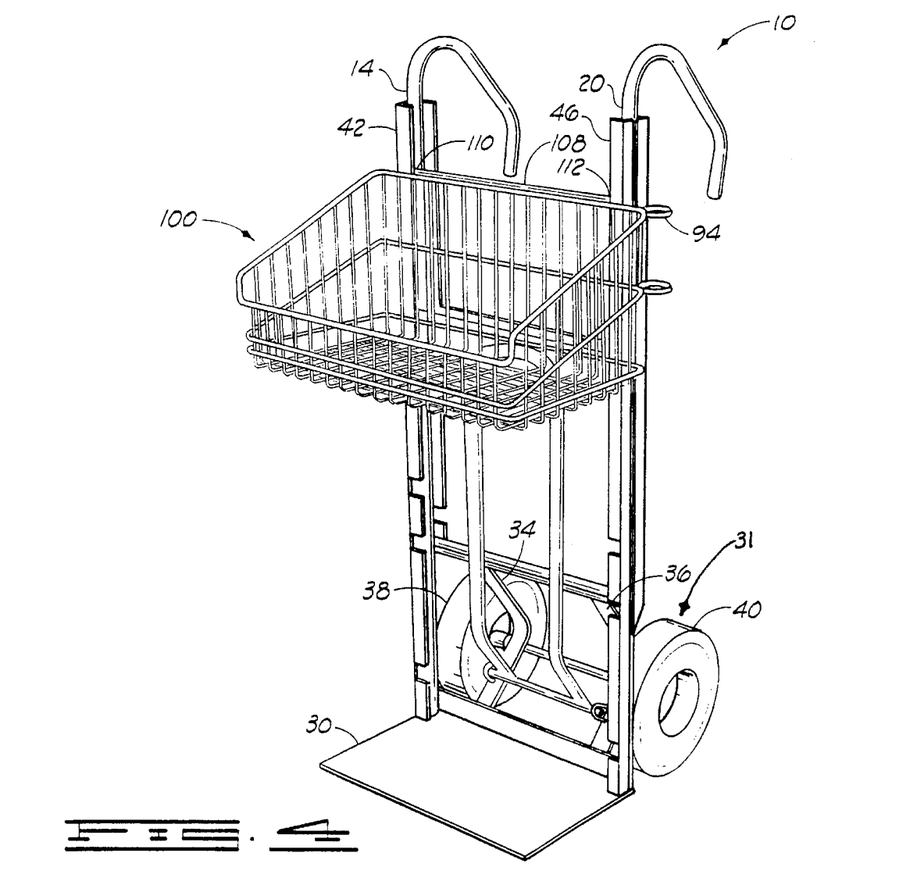
FIG. 4 is a front perspective view of the carrying basket of FIG. 3 attached to the personal material handling system of the present invention.

Shown in FIG. 4 is the carrying basket 100 slidingly attached to the frame 12 of the personal material handling system 10. As shown in FIGS. 4 and 5, the first and second ends 110 and 112 of the first attachment bar 108 are disposed in the channels formed by the first securing flange 42 and the first vertical member 14, and the third securing flange 46 and the second vertical member 20, respectively.

FIG. 5 shows the second attachment bar 114 disposed within the first securing flange 42 and the third securing flange 46. The first end 116 of the second attachment bar 114 rests on a flange stop 120 connected to the first vertical member 14 and the second end 118 of the second attachment bar 114 rests on a flange stop 122 attached to the second vertical member 20. The flange stops 120 and 122 act to arrest the movement of the first and second attachment bars 108 and 114.

Flange stops, such as flange stops 120 and 122, can be attached at various points on the first and second vertical members 14 and 20. Attachment bars can be inserted into flanges 42 and 46 via the receiving slots, such as receiving slots 50, 52 and 60 located on the first and second securing flanges 42 and 46. Other removable attachments, discussed in detail herein, can additionally be connected to the frame 12 of the handling system 10 by way of the securing flanges.

Figure 6:
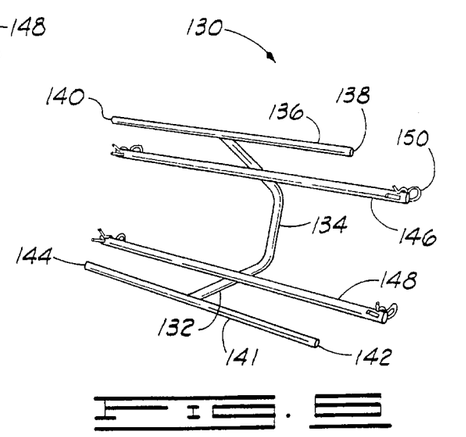
FIG. 6 is a rear perspective view of a multiple spool holder.

One such removable attachment, a multiple spool holder 130, is shown in FIG. 6. The multiple spool holder 130 has a support bar 132 connected to a first attachment bar 136 with a first end 138 and a second end 140. The support bar 132 is connected additionally to a second attachment bar 141 with a first end 142 and a second end 144.

The multiple spool holder 130 additionally includes a plurality of receiving bars, which are attached to the support bar 132, two receiving bars 146 and 148 being shown in FIG. 6. The receiving bars 146 and 148 have ends wherein are formed holes to allow the insertion of cotter pins, such as cotter pin 150 shown in FIG. 6. The multiple spool holder 130 additionally comprises a carrying handle 134 formed from the support bar 132. Appropriately sized spools of wire, such as spools 152 and 154, are slipped on the receiving bars 146 and 148 and the cotter pins 150 are inserted in the ends of the receiving bars 146 and 148 to hold the spools of wire upon the receiving bars 146 and 148.

FIG. 7 shows the multiple spool holder 130 attached to the handling system 10. Ends of the first attachment bar 136 and the second attachment bar 141 slide within the first securing flange 42 and the third securing flange 46. The second attachment bar 141 is held in position by the flange stops 120 and 122 (FIGS. 4 and 5), in exactly the same manner as the carrying basket 100, shown in FIG. 4. It is understood that, in some embodiments of the invention, more than one multiple spool holder 130 or carrying basket 100 may be slidingly secured to the personal material handling system 10 by inserting at least one of the attachment bars, such as the first attachment bar 136 (FIG. 5) or the first attachment bar 108 (FIG. 5) within either the first and third securing flanges 42 and 46 or the second and fourth securing flanges 44 and 48.

The preferred embodiment of the handling system 10 incorporates a removable reel holder 160. The reel holder 160 comprises a first U-shaped member 162 which is connected to a support bar 164 having a first end 166 and a second end 168. Additionally, a second U-shaped member 170 is rotatably connected, via connecting pins 174 and 172, to the first U-shaped member 162. A plurality of securing hooks, such as securing hooks 176 and 178, are disposed on the first U-shaped member 162 and the second U-shaped member 170. Additionally, the first U-shaped member 162 may include holes adapted to receive a reel axle, such as reel axle 186 shown in FIG. 8.

Figures 8, 9:
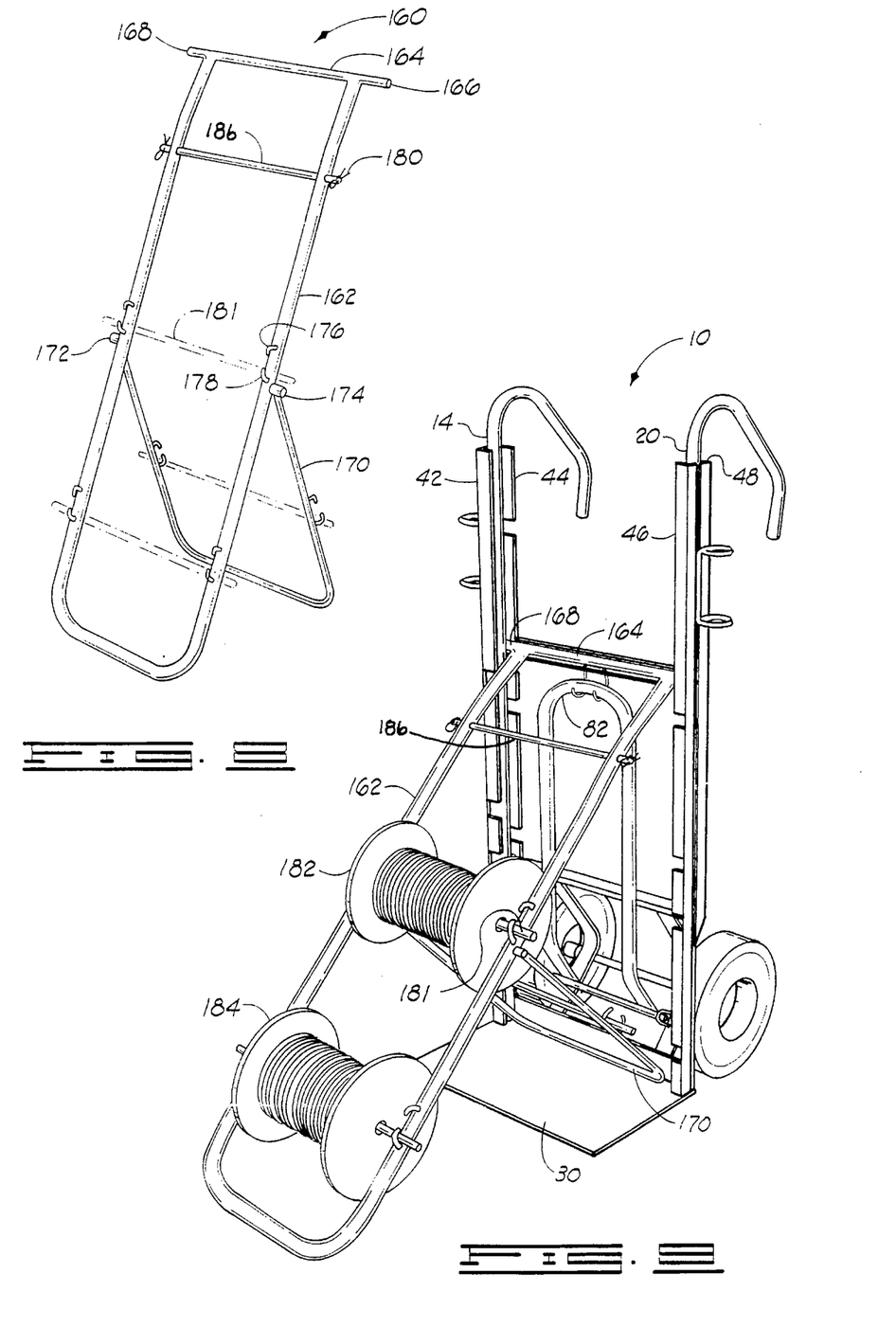
FIG. 8 is a front perspective view of a reel holder.
FIG. 9 is a front perspective view of the reel holder of FIG. 8 attached to the personal material handling system of the present invention wherein the reel holder is in a receiving position.

Additional reel axles may be removably secured to the first U-shaped member 162 or the second U-shaped member 170 via securing hooks such as securing hooks 176 and 178. FIG. 8 shows reel axle 186 extending through one of the holes in the first U-shaped member 162 and secured with cotter pins such as the cotter pin 180, and shows three additional reel axles, one of which is numbered 181, removably secured via securing hooks such as the securing hooks 176 and 178 to the first U-shaped member 162.

As shown in FIG. 9, the support bar 164 of the first U-shaped member 162 is fitted within the second securing flange 44 and the fourth securing flange 48, and allowed to slide until it is held by the flange stops 120 and 122 (FIG. 5). The second U-shaped member 170 presses against the support plate 30, or another part of the frame 12, and the first U-shaped member 162 extends a distance from the frame 12, thereby placing the reel holder 160 in an extended position. Reels of wire, such as the reels of wire 182 and 184 are placed upon the reel axles, such as the reel axle designated by the numeral 181 in FIG. 9, and can thereby be transported via the personal material handling system 10. When the reel holder 160 is in the extended position, greater stability of the handling system 10 in the upright position is achieved, thereby assisting in the removal of wire from reels such as the wire reels 182 and 184.

Figures 10, 11:
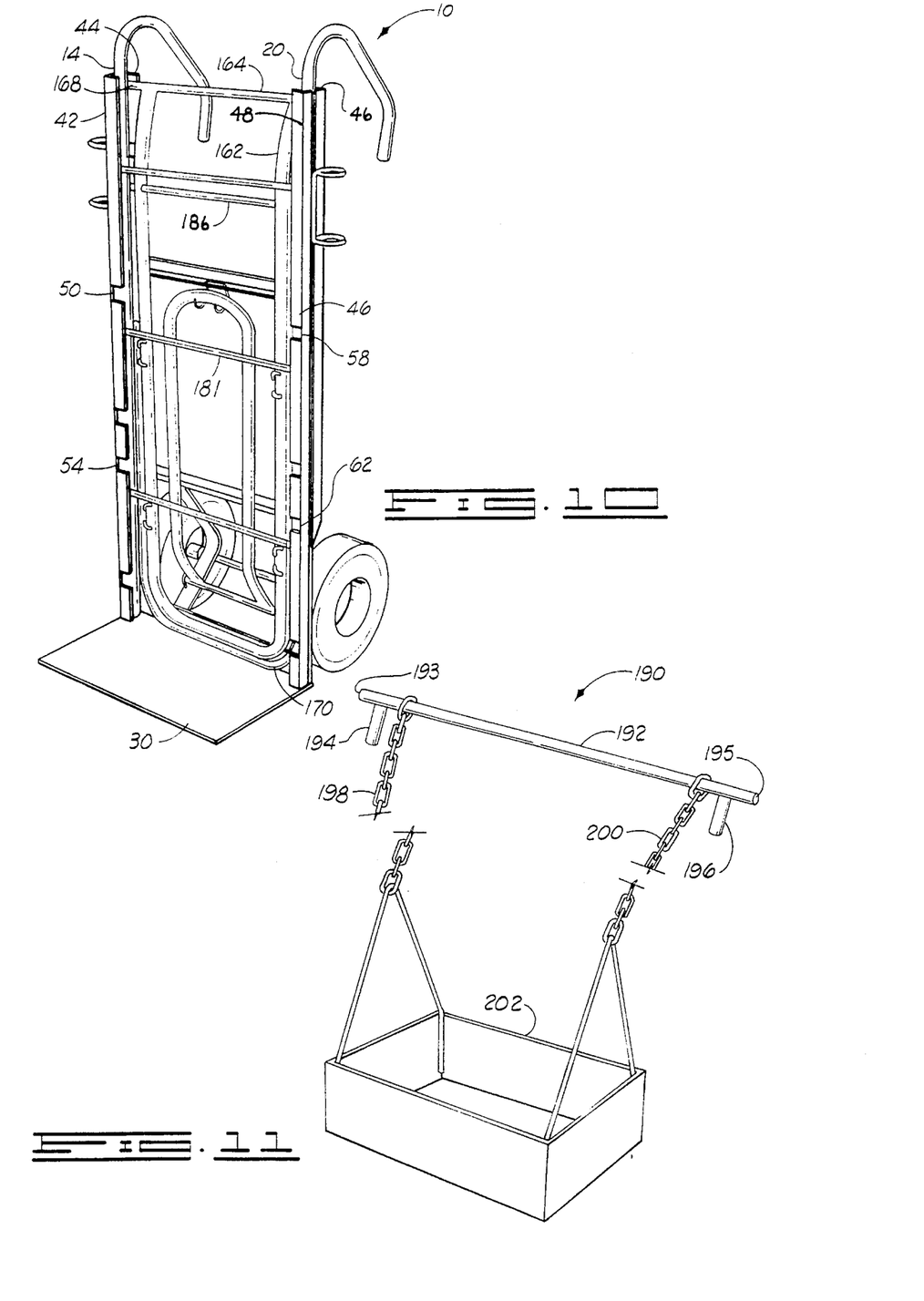
FIG. 10 is a front perspective view of the reel holder and personal material handling system of FIG. 9 having the reel holder in a secured position.
FIG. 11 is a front perspective view of a long stock holder.

FIG. 10 shows the reel holder 160 in a retracted position. The support bar 164 is slidingly raised within the securing flanges 44 and 48, the first U-shaped member 162 is brought rearward to a generally vertical position along the first and second vertical members 14 and 20, within the receiving flanges 42 and 46. The reel axles, such as the reel axle 181 are slid into the securing flanges 42 and 46, either from an end of the securing flanges 42 and 46 or via receiving slots such as receiving slots 50 and 58, thereby acting to secure the reel holder 160. When the reel holder 160 is in the retracted position, the handling system 10 can be used in the same manner as an ordinary hand truck.

A second removable attachment for mounting on the handling system 10, a long stock holder 190, is shown in FIG. 11. The long stock holder 190 comprises a securing bar 192 having a first end 193, a first securing pin 194, a second end 195, and a second securing pin 196. The securing bar 192 is connected to a bucket 202 via support chains 198 and 200.

Figure 12:
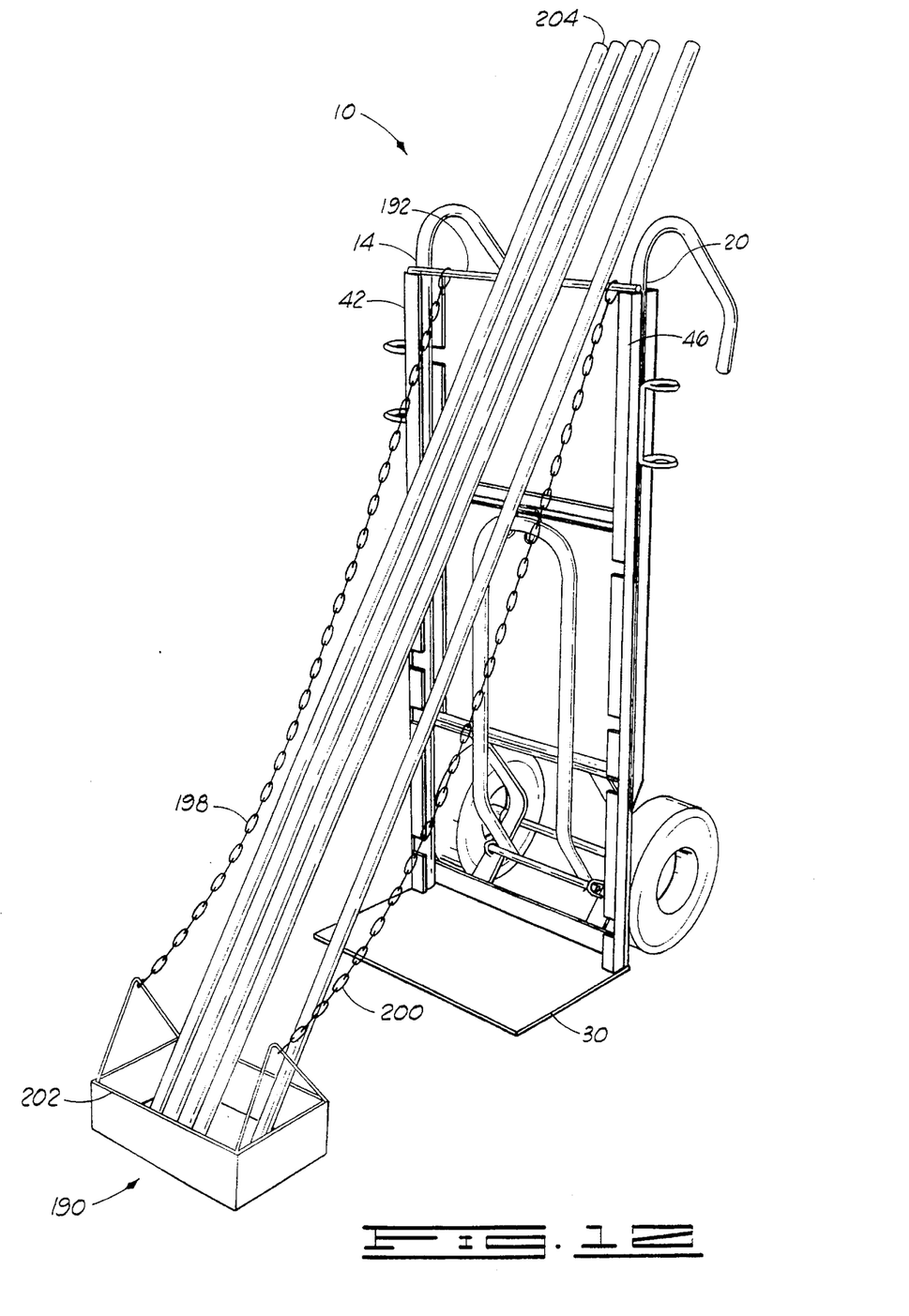
FIG. 12 is a front perspective view of the long stock holder of FIG. 11 attached to the personal material handling system of the present invention and loaded with sections of pipe.

FIG. 12 shows the long stock holder 190 attached to the handling system 10 in an upright position. The securing bar 192 is disposed across the ends of the securing flanges 42 and 46 with ends 193 and 195 of the securing bar 192 extending a distance above the edges of the securing flanges 42 and 46. The securing pin 194 fits generally within the securing flange 42 and the securing pin 196 fits generally within the securing flange 46. Pieces of pipe or electrical conduit, such as the piece of electrical conduit numbered 204 in FIG. 12, are seated in the bucket 202. The securing bar 192 acts to support a portion of the pipe or electrical conduit 204 when the handling system 10 is in an upright position.

As shown in FIG. 13, the electrical conduit 204 is held by the bucket 202, the weight of the conduit 204 acting to put tension on the support chains 198 and 200. A portion of the conduit 204 rests against a lip of the support plate 30 and a further portion of the conduit 204 rests against the securing bar 192. The conduit 204 is thereby retained by the long stock holder 190, and is available for transport via the handling system 10.

Figure 14:
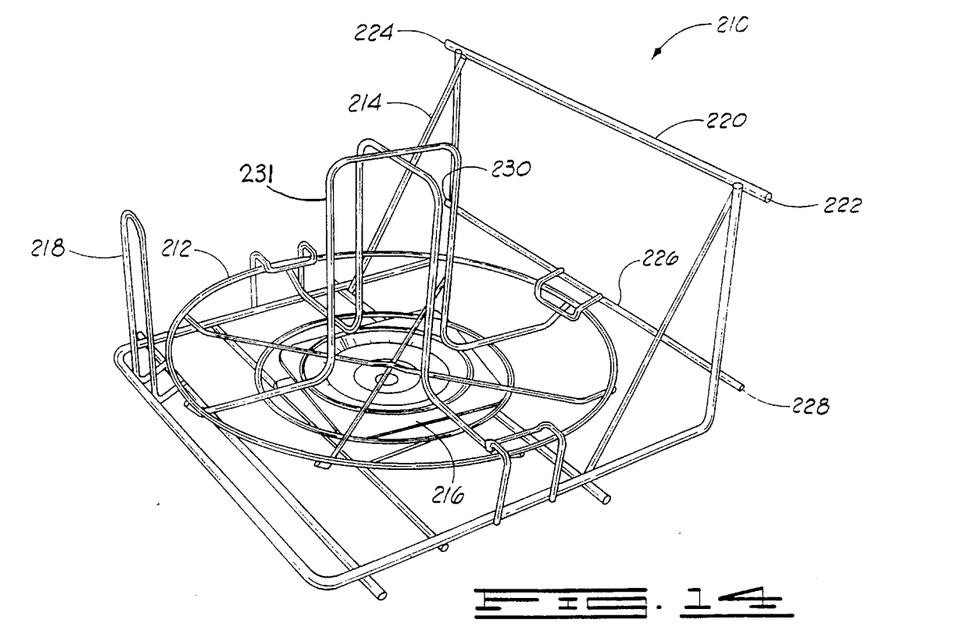
FIG. 14 is a front perspective view of a cable spindle reeler.

Still another handling system 10 attachment, a cable spindle 210, is shown in FIG. 14. The cable spindle 210 has a reel frame 214 having a first support bar 220 with ends 222 and 224 and a second support bar 226 having ends 228 and 230. The cable spindle 210 additionally has a reel mount 212 attached to the reel frame 214 via a swivel mount 216. The reel frame 214 comprises a reel seat 231 for receiving a reel of coaxial cable and a cable guide 218 for securing a cut end of coaxial cable.

Figures 15, 16:
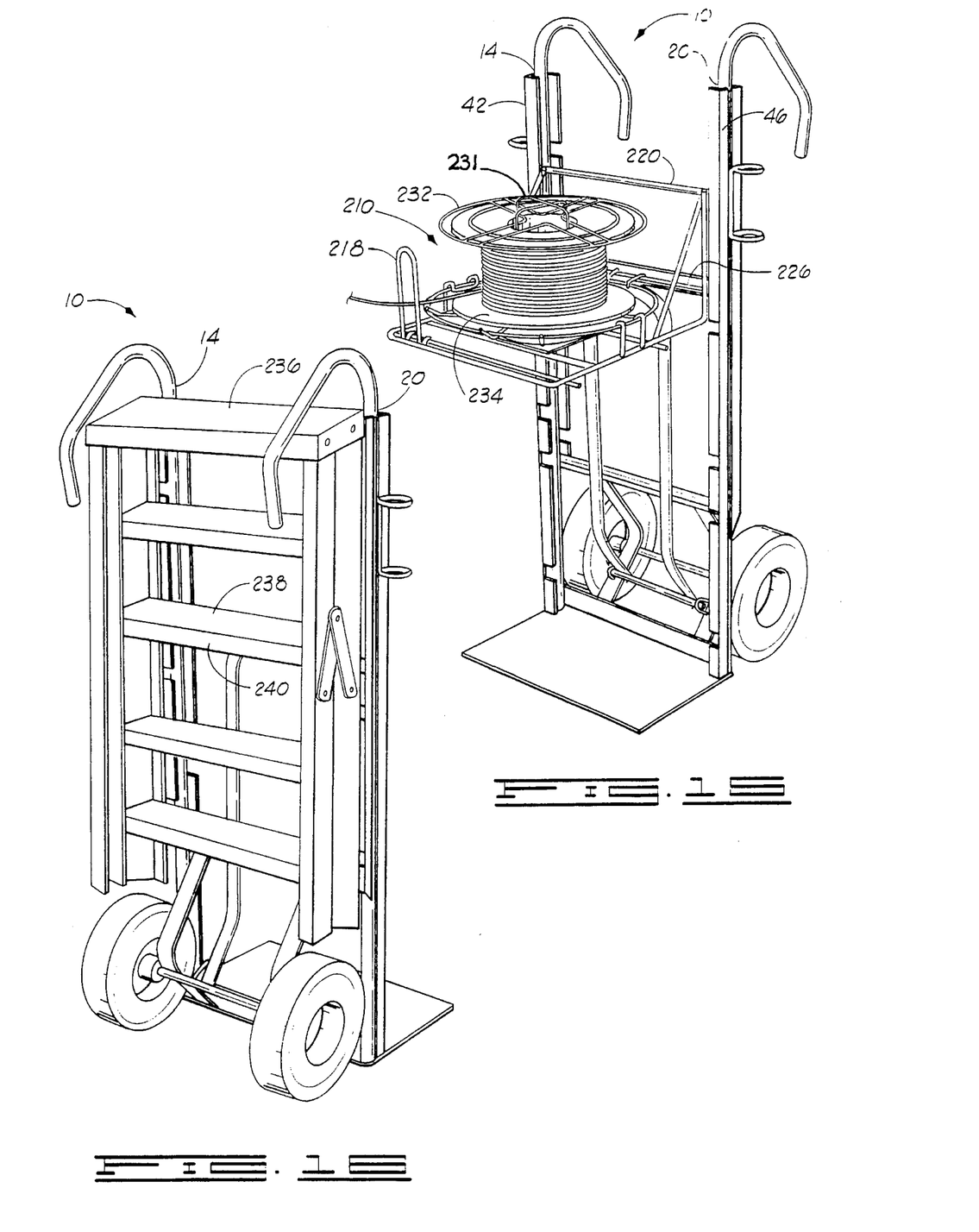
FIG. 15 is a front perspective view of the personal material handling system of the present invention with the cable spindle of FIG. 14 attached thereto.
FIG. 16 is a rear perspective view of the personal material handling system of FIG. 1 having a folding ladder attached thereto.

The cable spindle 210 is disposed on the handling system 10 in exactly the same manner as the carrying basket 100, shown in FIGS. 3 and 4 and the multiple spool holder 130 shown in FIGS. 6 and 7. As shown in FIG. 15, a reel of coaxial cable 234 is disposed within the cable spindle 210. A removable cover 232 is placed on the reel of coaxial cable 234 to help secure the reel of coaxial cable 234 on the reel seat 231. The free end of coaxial cable 234 is fed via the cable guide 218.

A ladder 236 can additionally be removably mounted on the handling system 10, as shown in FIG. 16. The ladder 236 is sized to fit between the first vertical member 14 and the second vertical member 20. In order to be carried by the personal material handling system 10 in this manner, the ladder 236 must include steps, such as step 238 having step flanges, such as the step flange 240 capable of being removably inserted into the ladder support 96 shown in FIG. 2.

Figures 17, 18:
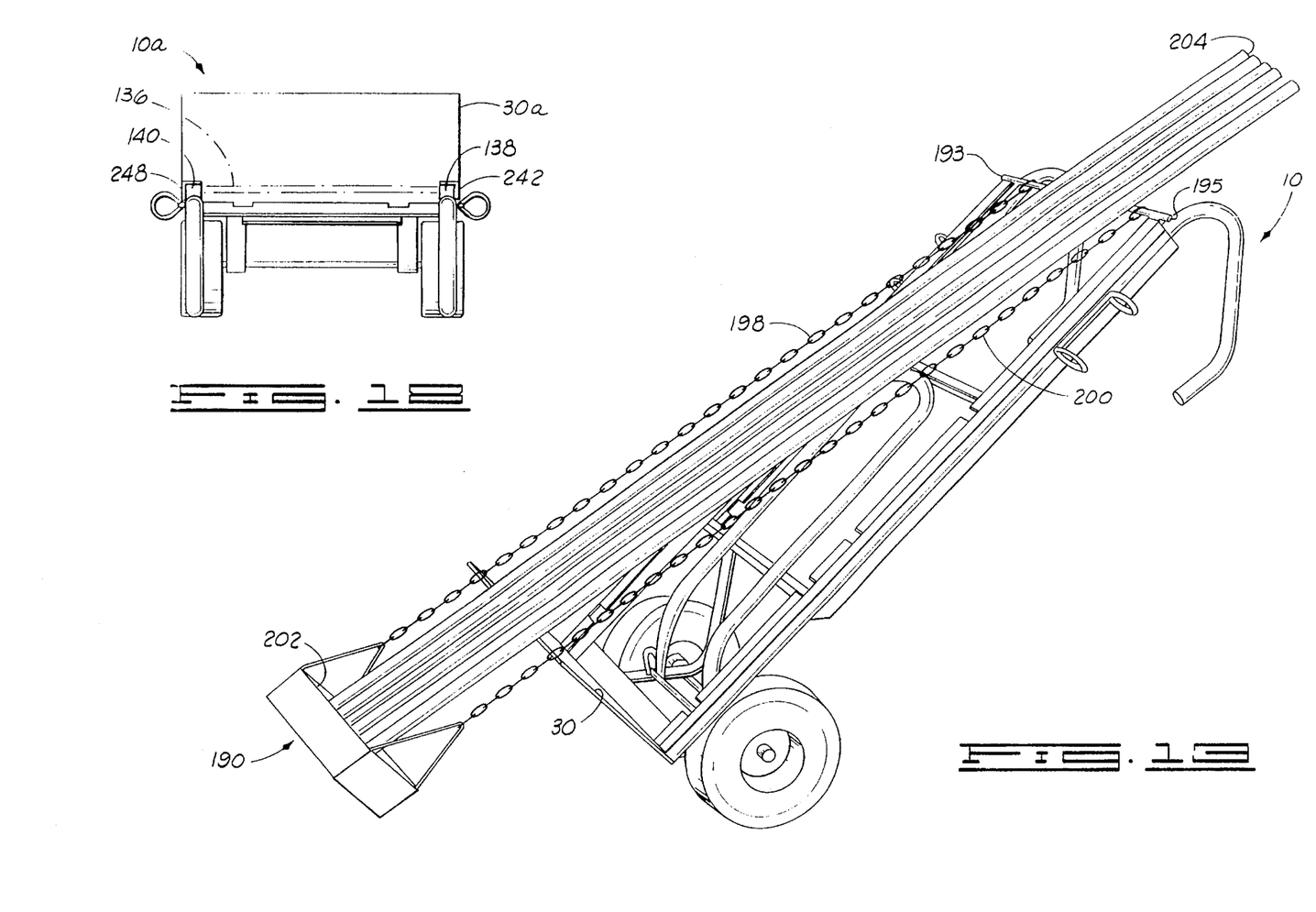
FIG. 17 is a front perspective view of another embodiment of a personal material handling system constructed in accordance with the present invention.
FIG. 18 is a top elevational view of the personal material handling system of FIG. 17 showing the disposition of a first attachment bar of a multiple spool holder mounted on the personal material handling system.
Figure 17:
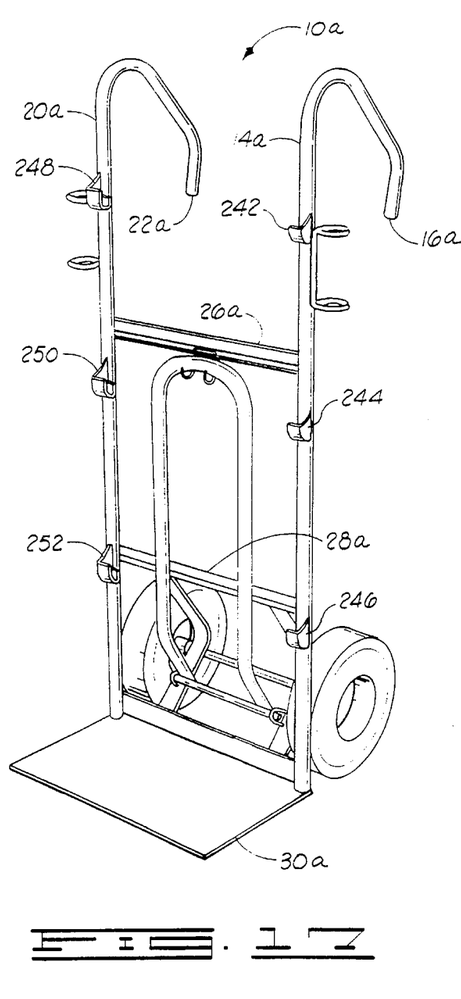

FIG. 17 shows another embodiment of the personal material handling system constructed in accordance with the present invention and given the reference numeral 10a. The handling system 10a is constructed in exactly the same manner as the handling system 10, except that the securing flanges 42, 44, 46 and 48 have been replaced by securing pockets, such as securing pockets 248, 250 and 252 shown disposed on a second vertical support 20a and securing pockets 242, 244 and 246 shown disposed on a first vertical support 14a.

Figure 19:
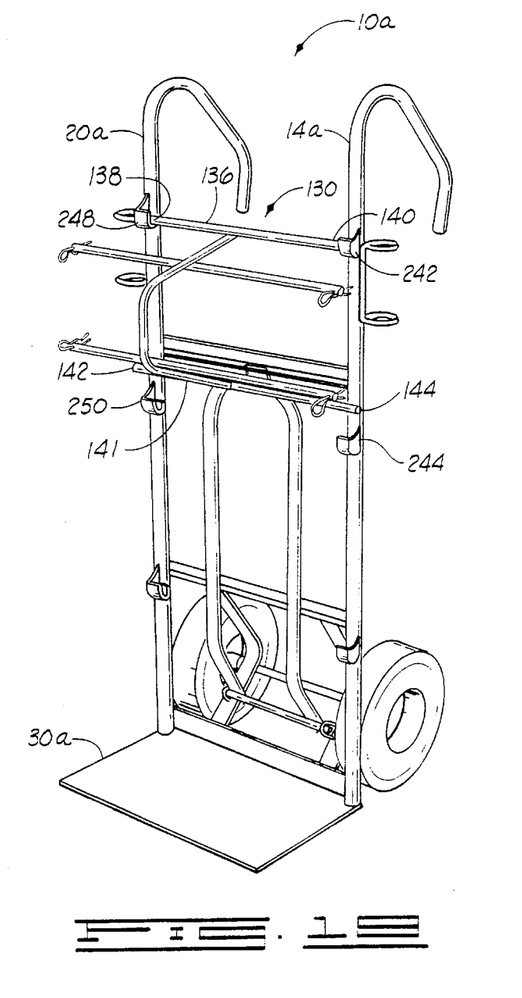
FIG. 19 is a front perspective view of the personal material handling system of FIG. 17 having a multiple spool holder attached thereto.

FIGS. 18 and 19 show the handling system 10a with the first attachment bar 136 of the multiple spool holder 130 positioned in the securing pockets 242 and 248. The ends 144 and 142 of the second attachment bar 141 of the multiple spool holder 130 are generally adjacent the first and second vertical supports 14a and 20a respectively, but are not secured in securing pockets.

Figures 20, 21:
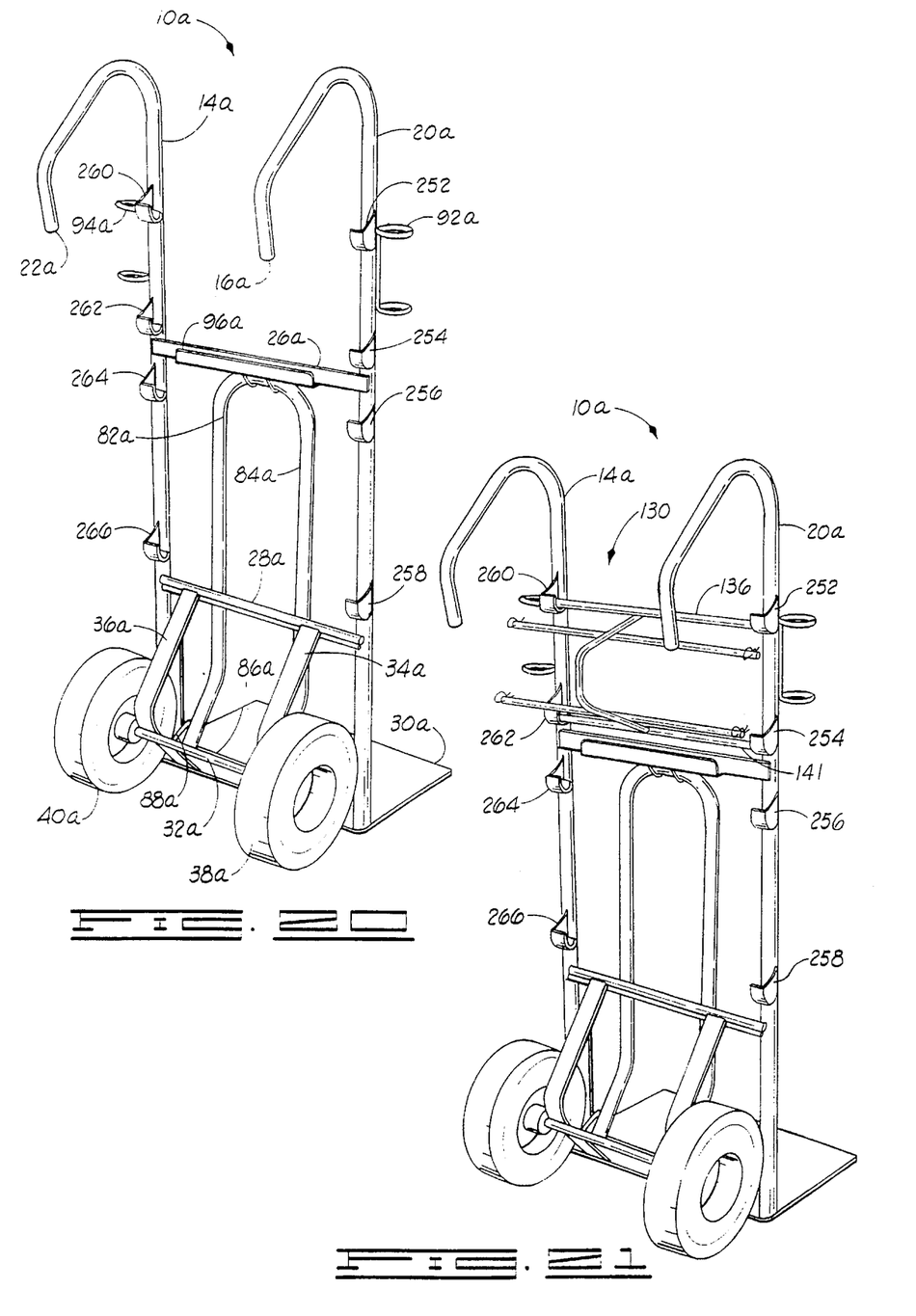
FIG. 20 is a rear perspective view of the personal material handling system of FIG. 17.
FIG. 21 is a rear perspective view of the personal material handling system of FIG. 17 having the multiple spool holder attached thereto.

FIG. 20 is a rear view of the personal material handling system 10a shown in FIG. 19 showing securing pockets 260, 262, 264 and 266 on the first vertical member 14a and securing pockets 252, 254, 256 and 258 on the second vertical member 20a. Attachments are connected to the front and rear of the personal material handling system 10a as desired.

FIG. 21 shows the multiple spool holder 130 removably attached to the personal material handling system 10a, with ends of the first attachment bar 136 disposed in the securing pockets 260 and 252 and ends of the second attachment bar 141 disposed in the securing pockets 262 and 254. With ends of the first and second attachment bars 136 and 141 positioned within the securing pockets, the multiple spool holder 130 will be secured to the personal material handling system 10a when the personal material handling system 10a is placed in an operating position.

Figure 22:
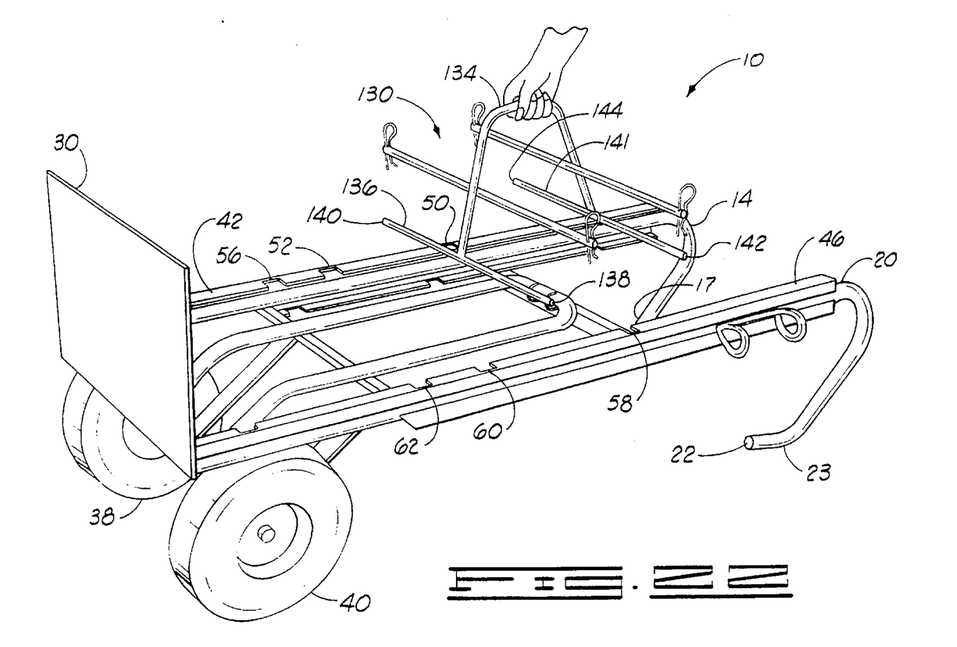
FIG. 22 is a front perspective view of the personal material handling system of FIG. 2 having the personal material handling system disposed in a horizontal loading position.

In addition to the upright position shown in FIGS. 1 and 2, and the operating position shown in FIG. 13, the personal material handling systems 10 and 10a may also be placed in a vertical loading position as shown in FIG. 22. In this position, the personal material handling systems 10 and 10a are supported by the hand grips 17 and 23 formed from portions of the first and second vertical members 14, 14a, 20, and 20a. The handling systems 10 and 10a are additionally supported by the wheels 38 and 40. Placing the personal material handling system in the vertical loading position may assist in affixing the attachments, such as the multiple spool holder 130, to the personal material handling systems 10 and 10a. As shown in FIG. 22, an operator is holding the multiple spool holder 130 via the handle 134, and is in the process of lowering the multiple spool holder 130 onto the personal material handling system 10, where the ends 138 and 140 of the first attachment bar 136 and the ends 142 and 144 of the second attachment bar 141 are secured within the securing flanges 42 and 46 via appropriate receiving slots, such as receiving slots 50, 52, 58 and 60.

It is understood that, in operation, the number and configuration of the attachments to the personal material handling system 10 or 10a, specifically the carrying basket 100, the multiple spool holder 130, the long stock holder 190, and the cable spindle 210 will change depending on the required load carrying application. For example, a particular application can require two multiple spool holders 130 and the long stock holder 190, whereas another application can require three carrying baskets 100. However, preferred embodiments of the handling system 10 or 10a will include the removable reel holder 160, which can be used alone or in combination with the attachments.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A personal material handling system, comprising:

a frame comprising a first vertical member having a first end and a second end, and a second vertical member having a first end and a second end and at least one cross-member connected to the first and second vertical members, and a support plate connected to the second ends of the first and second vertical members;

wheel means connected to the frame for rollingly supporting the frame; and a reel holder removably connected to the frame, the reel holder comprising a first U-shaped member removably connected to the first and second vertical members of the frame, a second U-shaped member movably connected to the first U-shaped member, and axle means for holding reels of wire, the reel holder having an extended position wherein the first and second U-shaped members of the reel holder cooperate with the first and second vertical members and the support plate of the frame to promote the stability of the personal material handling system when the personal material handling system is in an upright position, the reel holder also having a retracted position wherein the first and second U-shaped members of the reel holder are disposed substantially adjacent the first and second vertical members of the frame such that the reel holder is positioned within the frame of the personal material handling system.

2. The personal material handling system of claim 1 further comprising a nose extension movably connected to the first and second vertical members of the frame or to the wheel means, the nose extension having an extended position and a retracted position.

3. The personal material handling system of claim 1 further comprising a ladder support attached to the frame for holding and removably securing a ladder to the frame of the personal material handling system.

4. The personal material handling system of claim 1 additionally comprising at least one cable bender holster attached to the frame of the personal material handling system for holding and removably securing a cable bender thereto.

5. The personal material handling system of claim 1, wherein a first hand grip is connected to the first vertical member of the frame and a second hand grip is connected to the second vertical member of the frame, the first and second hand grips cooperating with the wheels to hold the frame a distance from a surface when the personal material handling system is placed in a horizontal position.

6. A personal material handling system, comprising:

a frame comprising a first vertical member having a first end and a second end and a second vertical member having a first end and a second end, at least one cross-member connected to the first and second vertical members, and a support plate connected to the second ends of the first and second vertical members;

wheel means connected to the frame for rollingly supporting the frame; and a reel holder removably connected to the frame, the reel holder comprising a first U-shaped member removably connected to the first and second vertical members of the frame, a second U-shaped member movably connected to the first U-shaped member, and means for holding reels of wire, the reel holder having an extended position wherein the first and second U-shaped members cooperate with the first and second vertical members and the support plate of the frame to promote the stability of the personal material handling system when the personal material handling system is in an upright position, the reel holder also having a retracted position wherein the first and second U-shaped members of the reel holder fold along the first and second vertical members of the frame to position the reel holder within the frame of the personal material handling system; and at least one attachment removably connected to the frame, the attachment being selected from a group consisting of a long stock holder, a basket, a cable spindle, and a multiple spool holder.

7. The personal material handling system of claim 6 further comprising a nose extension movably connected to the first and second vertical members of the frame or to the wheel means, the nose extension having an extended position and a retracted position.

8. The personal material handling system of claim 6 further comprising a ladder support attached to the frame for holding and removably securing a ladder.

9. The personal material handling system of claim 6 additionally comprising at least one cable bender holster attached to the frame for holding and removably securing a cable bender.

10. The personal material handling system of claim 6, wherein a first hand grip is connected to the first vertical member of the frame and a second hand grip is connected to the second vertical member of the frame, the first and second hand grips cooperating with the means for rollingly supporting the frame to hold the frame a distance from a surface when the personal material handling system is placed in a horizontal position.

* * * * *